Jan. 7, 1964 V. PIERON ETAL 3,116,832
METHOD AND CONTROL APPARATUS FOR PULLING EXTRUSIONS FROM DIES
Filed Sept. 23, 1959 9 Sheets-Sheet 5

INVENTORS
BENJAMIN F. SMITH
KENNETH L. HARWOOD
ARNOLD F. INGALLS
VERNON PIERON

BY Price and Heneveld

ATTORNEYS

United States Patent Office 3,116,832
Patented Jan. 7, 1964

3,116,832
METHOD AND CONTROL APPARATUS FOR
PULLING EXTRUSIONS FROM DIES
Vernon Pieron, Youngstown, Ohio, and Benjamin F. Smith, Kenneth L. Harwood, and Arnold F. Ingalls, Grand Rapids, Mich., assignors to Light Metals Corporation, Grand Rapids, Mich., a corporation of Michigan
Filed Sept. 23, 1959, Ser. No. 841,800
4 Claims. (Cl. 207—1)

This invention relates generally to a material handling method and apparatus, and more particularly to a method for pulling extrusions from dies and control apparatus therefor.

This application is a continuation in part of copending application Serial No. 634,014 filed January 14, 1957 entitled "Extrusion Puller," now abandoned.

Metal extruding processes require having a billet of the metal heated to a plastic or semi-plastic state. The billet is then placed in a container located in a press and disposed immediately behind an extrusion die. A hydraulic ram is disposed behind the billet to provide a continuous force which causes the material of the billet to flow through the extrusion die and assume the cross-sectional shape of the die opening. The extruded member or members is of a length dependent upon the size of the billet and the size and number of openings in the extrusion die. In those instances in which members of considerable length are formed, it is conventional to provide a run-out table that extends for a considerable length from the press. Such tables support the extrusions as they are being formed, and are intended to afford free flow of the billet material as it passes through the openings of the extrusion die.

The material received through an extrusion die is in a pliable state and readily subject to deformation. Accordingly, it has long been a practice to provide workers to guide the material as it passes over the run-out table. The workers exert either no pulling force or a slight and steady force on the strip members as they are extruded and flow out over the run-out table. Their purpose is to prevent the extruded strips from buckling or touching other extruded strips and to direct the strips in a straight path. The highly pliable state of the extruded strips causes the members formed to also be subject to deformation due to stretching.

The plastic or pliable state of the extruded members, causing such care to be taken in running them out, has heretofore discouraged manufacturers from using mechanical handling means in place of the workers mentioned. However, the use of manual labor has its limitations also. When several extruded members of considerable length emerge from a single die, more than one or two workers may be required. Aside from the labor cost, the workers often get in each others' way in attempting to allow their extrusions to flow naturally and in keeping them in a straight and free flowing path.

This invention is directed to the method and means for automatically controlling the receiving, engaging and direction of an extruded work piece, or plurality of work pieces, out over the run-out table as they are being formed and expelled through the extrusion forming die. Such means includes the control of work carriers that travel to and from the extrusion press and which include work grippers for engaging and holding a work piece therein. Further, means of automatic actuation of the work carrying means is incorporated within the work receiving heads thereof, so that the work member itself is instrumental in effecting the start of the run-out operation.

In brief, the material handling apparatus of this invention includes a plurality of overhead guide tracks extending between an extrusion press and a support tower located at the end of the run-out table. Each track guides a separate carrier member. Each carrier member includes its own work receiving head and means of engaging an extruded work member as it is received therein. Each carrier member also includes its own work gripper resetting mechanism. This invention also relates to the control system interrelated with the gripper and its resetting means to effect their automatic run-out and return travel.

Therefore, the objects of this invention include providing an automatically controlled extrusion puller mechanism for handling extruded work pieces or so-called "strips" during a metal extrusion process.

Another object of this invention is to provide a method of pulling extrusions from dies.

A further object of this invention is to disclose a work gripper means which is part of a work carrying device and includes means for automatically signaling the commencement of the carrier operation upon the receipt and engagement of a work member therewithin.

Other objects of this invention become more apparent upon reading the following specification in conjunction with the accompanying drawing wherein.

Referring to the drawings in further detail:

In certain instances the same reference numeral is used to designate separate but identical parts when there are several of these identical parts spaced closely together. This arrangement clarifies the drawings since it avoids crowding a multiplicity of unnecessary reference numerals into a small area.

The metal extruding or puller apparatus includes a press 10 (FIGS. 1 and 2) within which the actual extruding operation is performed. A run-out table 20 is provided at the extrusion gripper receiving side of the press 10. An overhead track arrangement, designated generally as 30, extends over the run-out table 20 between the press 10 and a tower 40 provided beyond the end of the run-out table. A plurality of extrusion handling devices, designated generally as 50, are supported on the overhead track arrangement 30. The extrusion handling devices 50 are adapted to travel separately from the press 10 towards the tower 40 and, in so doing, to guide extrusions received from the press out over the run-out table 20.

The extrusion press 10 includes a housing 11 having a cylindrical passage formed therethrough to receive the billet 12 of material to be extruded and the press ram 13 which provides the extruding force. The housing 11 may receive the billet 12 in a preheated and semi-plastic state by any well known manner. Said housing includes heating means (not shown) to keep the billet in such a pliable state. A die 14, having a given number of die openings 15 (FIGS. 1 and 2) of a certain shape, is located within a support 16 immediately forward of the billet housing 11. The support 16 is usually movable relative to the billet housing 11 to enable the ready exchange of die forms having different extrusion forming openings.

A platen 17 is located forward of the die 14. This platen 17 includes a canister passage within which is disposed an elongated cylindrical member 18 generally referred to as a canister which has a plurality of passages (not illustrated) formed therethrough. The passages correspond in number to the die openings 15 of a particular die member and are intended to receive and direct the extruded work pieces through the platen 17.

The run-out table 20 is disposed to receive extrusions passing from the canister 18. Accordingly, the height of the run-out table is substantially level with the lower edge of the canister. The table includes a flat platform like graphite surface 21 which extends for a considerable length from the press 10. It is desirable to have the run-out table sufficiently long to accommodate the extrusions from a single billet.

The overhead guide track arrangement 30 requires some form of overhead support. Such support may be derived from hangers 31 attached to an overhead beam (not shown) depending from the building roof supports. The hangers 31 are provided at spaced intervals as necessary to maintain guide track members 32 in substantially a horizontal position. A pair of parallel spaced bars 33 and 34 (FIG. 4), separated by threaded bolt and lock unit means 35 and 35a, are secured to the hangers 31 and have the guide track brackets 36 secured thereto. The guide tracks 32 are received through the brackets 36 and are held engaged within the brackets by the head end of the bolt means 37 that secures the brackets to the bar 34.

The guide tracks 32 are of inverted channel shaped cross-section with inbent flanges at their open lower side. A plurality of the guide tracks 32 are secured to the overhead hangers in close parallel relation to afford distinctly separate tracks for different extrusion handling devices designated generally as 50. The number of tracks 32 and devices 50 in use depends upon the number of work pieces that are to be extruded at the same time, as will be shown.

Figure 1:
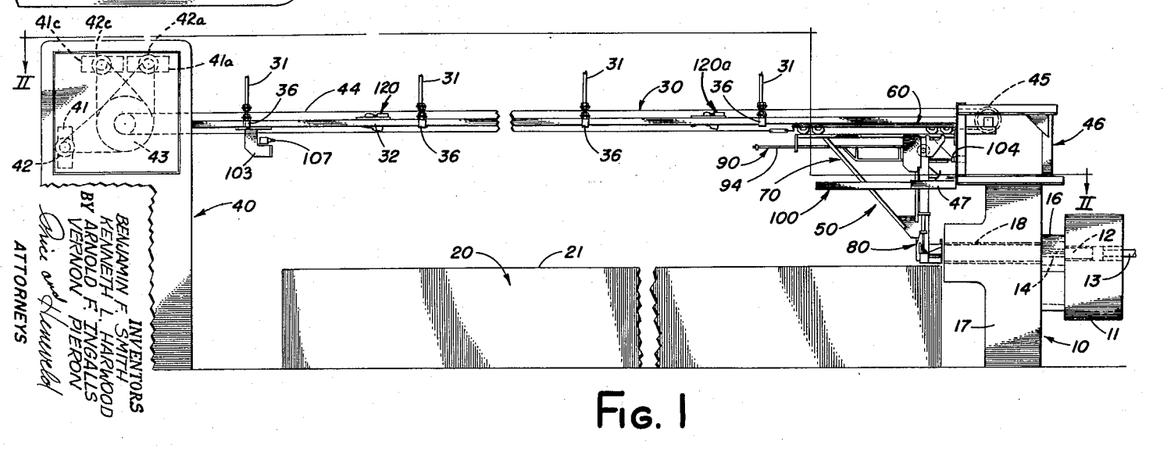
FIG. 1 is a side plan view of the extrusion handling apparatus of this invention.
Figure 2:
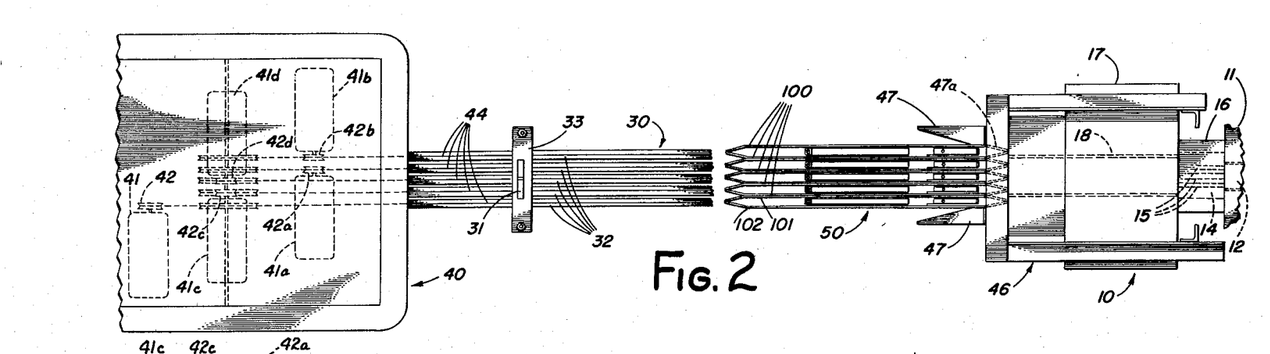
FIG. 2 is an enlarged top elevational plan view of the extrusion handling apparatus of FIG. 1 taken along the section line II—II thereof, and looking in the direction of the arrows.

The drive means for the extrusion handling devices 50, as they travel on the guide tracks 32, includes separate drive motors 41, 41a, 41b, 41c and 41d mounted within the tower 40 (FIGS. 1 and 2). The drive motors 41, 41a, 41b, 41c, and 41d each include a pulley 42, 42a, 42b, 42c and 42d, which drives one of a plurality of axially aligned pulleys 43 upon which wire cables 44 travel. The cables 44 pass over idler pulleys 45 provided in a housing 46 on top of the press 10. The ends of each cable 44 are connected to opposite ends of one of the extrusion handling devices 50.

The extrusion handling devices 50 each include a carriage or trolley portion, designated generally as 60 (FIGS. 1 and 3) having a support frame, designated generally as 70, secured thereto. A work piece gripping mechanism, designated generally as 80, is provided at the lower end of each support frame 70. A gripper resetting mechanism, generally 90, is provided within each of the support frames 70 and each frame also includes its own bumper guard and guide means 100, as will be described.

The carriage or trolley 60 of the extrusion handling devices 50 include an elongated bar 61 (FIGS. 3 and 4) having wheeled tracking members 62 that are received within the guide tracks 32 and have their wheels disposed for rolling engagement with the inbent flanges thereof.

The support frames 70 are secured to the trolley or carriage members 60 by means of mounting blocks 66. The mounting blocks, shown in more detail in one of the instant applicant's copending application Serial No. 841,716 entitled "Puller for Extrusion Apparatus" and filed September 23, 1959, now Patent No. 3,058,587 issued October 16, 1962 are of a durable resilient material to afford relatively vibration-free and shock resistant support of the frames 70 on the carriers 60.

The support frames 70 comprise a horizontal support member 71 (FIG. 3) of tubular cross section for greater strength, having guide plates 72 (FIG. 3) secured on opposite sides and depending downwardly near one end thereof. A depending frame member 73 connects a lower disposed support plate 74 to the guide plates 72. The lower support plate 74 in turn is braced by a diagonal brace 75 (FIG. 3) extending upwardly and secured to the forward end of the horizontal support member 71.

Figures 3, 4:
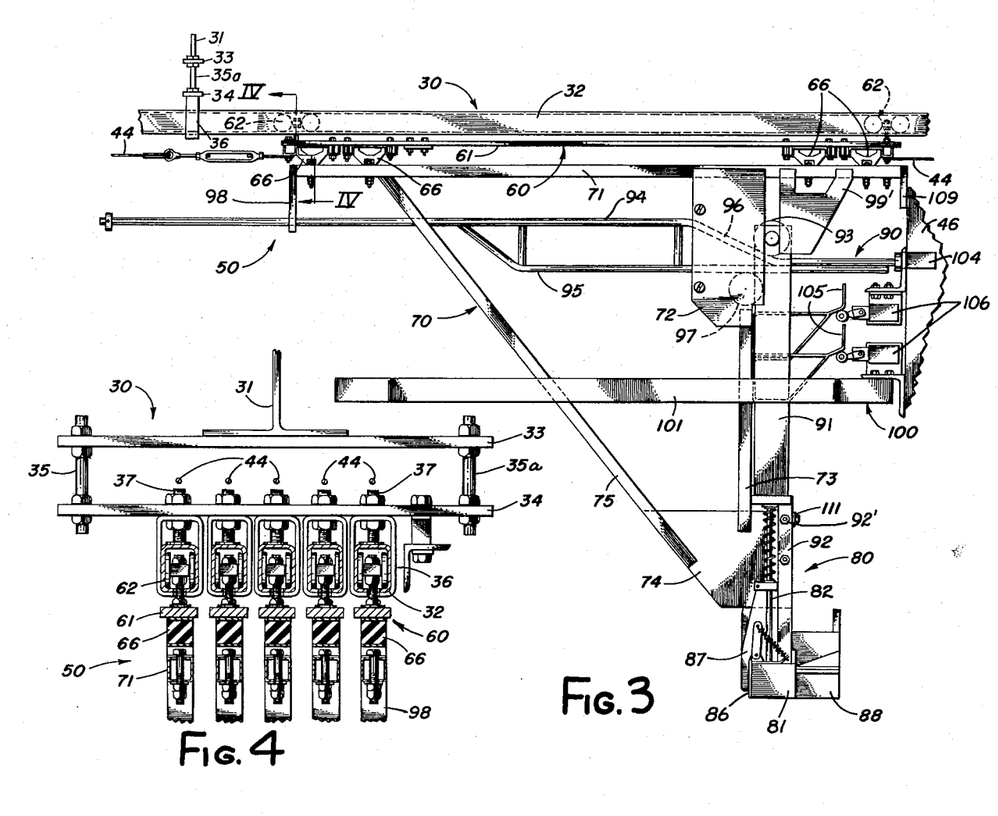
FIG. 3 is an enlarged side plan view of the trolley or carriage and work receiving support frame, of the extrusion handling apparatus, shown at the right in FIG. 1.
FIG. 4 is a further enlarged cross-sectional view of the trolley support means taken along the section-line IV—IV in FIG. 3 and looking in the direction of the arrows thereon.

The gripper device, generally 80, is best shown in FIGS. 3 and 5–8. FIG. 3 shows each of such devices to be secured to the support plate 74 of the respective frame 70 along the vertically straight sides thereof. A selected number of the gripper devices 80 can be used, one for each of the frames. The configuration and arrangement of these gripper devices depends upon the number and arrangement of the canister passageways. Copending application Serial No. 841,720 entitled, Extrusion Puller Equiment, filed September 23, 1959, shows different arrangements of such grippers.

Basically, each gripper mechanism includes the same structure and as a result only one gripper device 80 will be described in detail. This also applies to the reset mechanism hereinafter to be described.

The gripper devices 80 each include a work receiving head 81 secured to the support plate 74 of the carrier frame 70 by the bar 92 and bolt and nut assemblies 92'. This arrangement permits the easy removal of the entire gripper device 80 from the carrier frame 70 so that different gripper devices can be mounted on the frame for different arrangements required for 1, 2, 3, 4 or 5 hole dies. Control rod 82 is journaled in rod guides 201 for vertical reciprocal movement relative thereto. The rod guide 201 is secured to the bar 92. The lower end of rod 82 extends downward and has a work engaging jaw or foot 83, extending into the work receiving member 81. In the gripper device 80, the rod 82 is centrally located in the work receiving member. Coil spring 84 is disposed on the control rod 82 and bears against rod guide 201 to exert a downward force on a collar 85, fixed to the control rod.

Figures 7, 8:
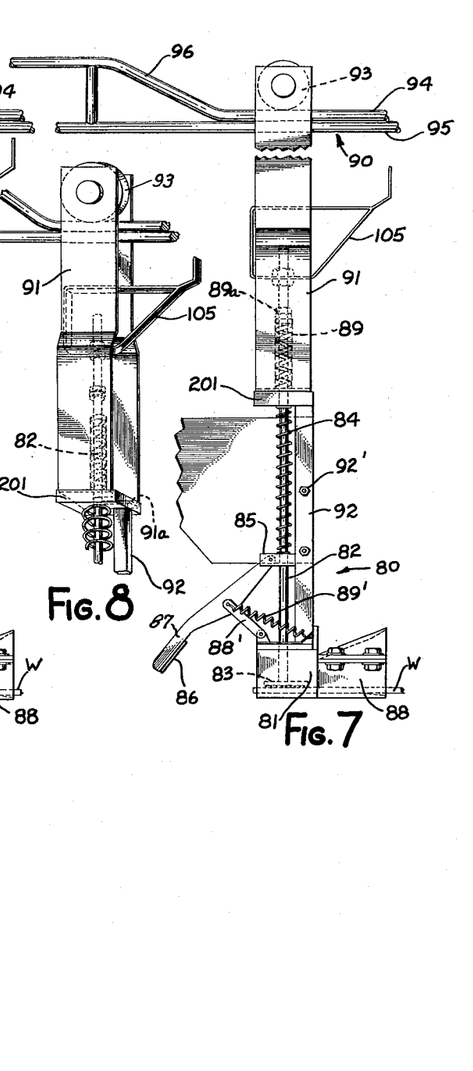
FIG. 7 is similar to FIGS. 5 and 6 with the exception of showing the work gripping mechanism as actuated.
FIG. 8 is a perspective view of the parts shown by FIGS. 5-7, exclusive of the gripper head.

The work receiving member 81 has a door or gate part 86 (FIGS. 3, and 5–7) closing one end thereof. An operating lever 87 is secured to the door part and is pivotally connected to the rod collar 85, at its other end. This arrangement is best shown by FIG. 7. The door operating lever 87 is also engaged to the work receiving member 81 by a pivotal link member 88'. A tension spring 89' is engaged between the work receiving member 81 and the operating lever 87, at the connection of the pivotal link 88' thereto. The spring 89' tends to keep the door part 86 closed over the end of the work receiving head 81. When the door member 86 is closed the force of the compression spring 84 acting on the rod collar 85 provides an over-center locking arrangement through the pivotal link 88'.

When an extruded work piece enters the work receiving member 81, and comes into contact with the closed door part 86, it moves the lever 87, which carries the link 88' past the over-center relation and the compression spring 84 drives the gripper jaw down simultaneously as the trap door 86 opens.

The gripper device 80 is operatively connected to a resetting mechanism designated generally as 90, which is disposed thereover. Each gripper device has a corresponding reset mechanism.

A U-shaped sleeve like member 91 having a slot 91a in the lower portion receives the gripper jaw actuating rod 82 therewithin. A spacer or spring 89 is provided on the rod and a pair of lock nuts 89a are secured to the rod. Spring 89 seats on the sides of slot 91a which thus keeps said spring 89 at all times within sleeve 91 as is clear from FIGS. 5–8. Thus, the member 91 is reciprocal relative to the rod 82 within the distance available between the end of the spacer or spring 89, when engaged with the lock nuts 89a, and the fixed guide bar 201. The entire gripper device 80 when detached from plate 74 is removable from member 91 by moving the upper end from within the space between the sides of member 91. In so doing rod 82 is removed from slot 91a.

A guide follower roller 93 is mounted at the upper end of the sleeve like member 91 between its sides. This roller is intended to ride upon a horizontally reciprocal cam surface of the reset mechanism 90.

The reset mechanism 90 includes a pair of bar or rod members 94 and 95, termed top and bottom respectively, disposed horizontally with the axes thereof in a vertical plane with respect to each other. The top bar 94 is bent downwardly and interconnected with a straight portion of the bar 95 in overlapping relationship. The bottom bar 95 is bent upwardly and secured to a straight portion of the top bar 94. This results in a member of trapezoidal configuration. One short side of the trapezoid forms a cam shoulder 96 on the uppermost bar 94 which is intended to lift the sleeve like member 91 by means of the guide follower roller 93 thereof as it rides thereover.

The interconnected rods 94 and 95 are guided for horizontal movement by a roller 97 mounted between the carrier frame plates 72 and a hanging guide 98 depending from the carrier frame member 71 (FIG. 3).

Small roller guide buttons 99 are provided on the outside of the shaft that supports the guide following roller 93, at the upper end of the member 91. These guide buttons are received between the edge of the carrier frame plates 72 and the edge of a guide plate 99' secured to the frame member 71 for the express purpose of forming a vertical guide slot for such buttons. Accordingly, as the interconnected rod members 94 and 95 are reciprocated back and forth, the sleeve like part 89 is raised and lowered due to the travel of the roller 93 over the cam shoulder 96 and the restraint against other than vertical travel imposed by the guide slot forming parts 72 and 99'.

Referring now to the sequence of operational positions of the gripper and resetting mechanisms 80 and 90, shown by FIGS. 5–8:

When the roller 93 rides over the cam shoulder 96, the U-shaped member 91 moves the spacer sleeve 89 upward. The spacer sleeve 89 engages the lock nuts 89a causing the gripper rod 82 to be lifted. This in turn raises the gripper jaw 83 and closes the door 86 over the end of the work receiving housing 81.

Figures 9, 10:
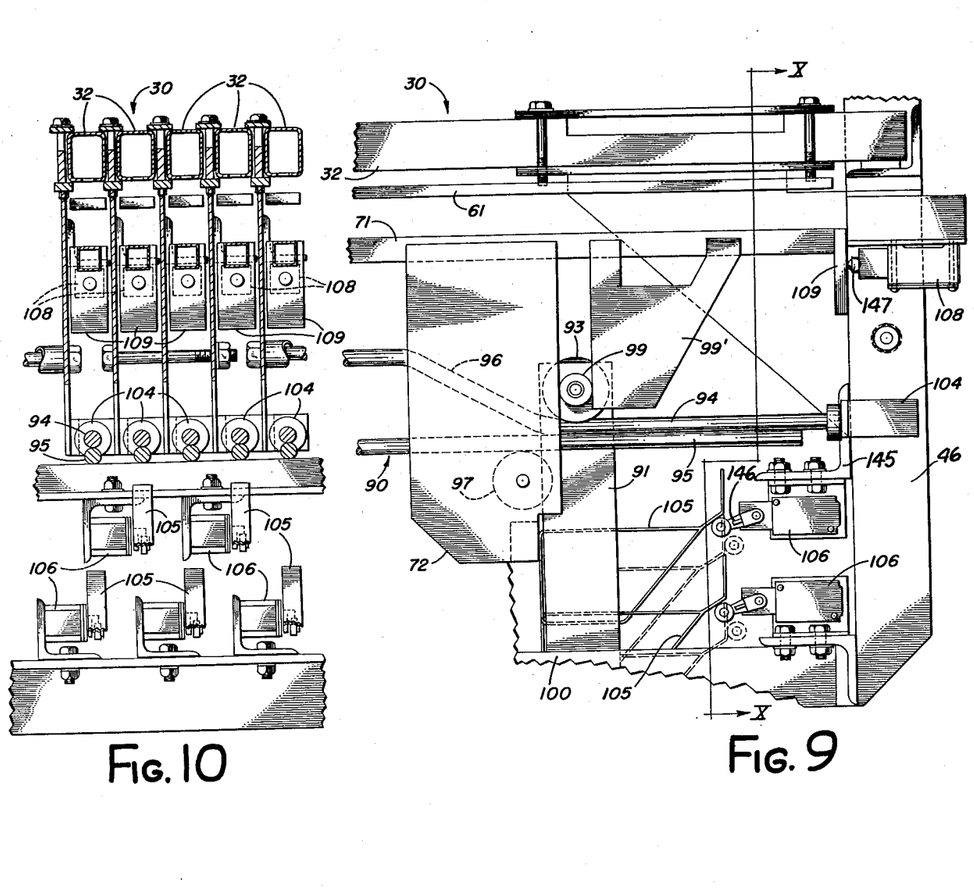
FIG. 9 is an enlarged side plan view of the upper part of a work carrier device to show the relative relation of the carrier and reset mechanism with respect to certain actuating controls.
FIG. 10 is an enlarged cross-sectional end view of the work carriers of this invention, taken along the section-line X—X of FIG. 9, looking in the direction of the arrows thereon. This view shows the relative relation of the carrier and reset mechanism with respect to certain control switches.

The return of the roller 93 to the bottom of the cam shoulder 96, as in FIG. 9, will not affect the gripper mechanism due to the free travel afforded the end of the sleeve like member 89 between the lock nuts 89a and the control rod 82. However, should a work piece engage the trap door 86, the gripper is triggered and the rod 82 moves the jaw part 83 into engagement with such work piece.

In the course of travel of the carriers 50, along table 20, they are guided relative to each other by the canoe shaped guards 100 (FIGS. 2, and 3) attached to the respective carriers. The use of such guide and guard means for the carriers in transit and for orienting the work receiving heads 81 at the press, is best described in copending patent application SN 841,720 entitled Extrusion Puller Equipment and filed September 23, 1959. In brief, the canoe shaped guards are formed by elongated members 101 and 102 disposed horizontally on each side of the carrier, and converging together at their ends. This enables them to guide the carriers, as shown by FIG. 2, and even when one carrier lags or advances beyond another. Their converging or tapered ends assist in nesting the carriers together, at the press, within guides 47. Also provided for positioning the carriers at the press is the plate 47a which has V-shaped cut out portions for receiving the tapered V-shaped ends of the canoes as shown by FIG. 2.

At the end travel positions for the carriers 50, stops 103, which are adjustable along the guide tracks, and fixed stops 104 are located for engagement and actuation of the reset mechanism 90. Stop 103 is mounted on the guide tracks 30 near the end of the run-out table 20, as best shown by FIG. 1. Stop 104 is mounted on the housing part 46 on top of the extruding press 10.

The end of rod 94 engages stop 103 as the carrier approaches the end of the run-out table 20. This causes the reset mechanism 90 to be moved relative to the carrier and the roller 93 to be raised on the cam shoulder 96. As the sleeve like housing 91 is raised it engages the spacer sleeve 89 and raises it into lifting engagement with the lock nuts 89a on the gripper control rod 82. As the control rod 82 is lifted, the gripper jaw 83 is released from the work piece and the rod collar 85 causes the door lever 87 to close the door or gate part 86, with the assistance of the tension spring 89'. As mentioned, the operating link 88' is arranged to provide an overcenter locking condition when the door or gate 86 is closed over the end of the work receiving housing.

Figures 5, 6:
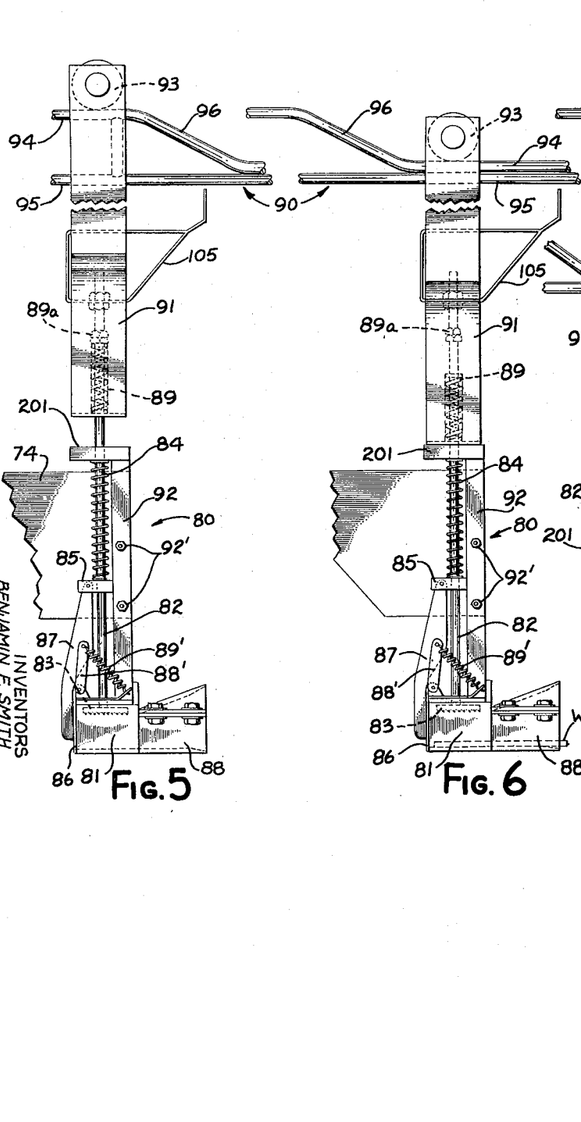
FIG. 5 is an enlarged side plan view of the work gripper mechanism and reset mechanism of this invention showing the work receiving head as just reset for subsequent use and in locked position.
FIG. 6 is similar to FIG. 5 with the exception that the reset mechanism is relocated to show the gripper triggering mechanism in unlocked position.

The reset mechanisms 90 have their rod parts 96 projecting outward towards the press 10 during the return travel of the carriers 50. As they approach the press 10, the rods 94 engage stops 104. The reset mechanisms are stopped and the carriers 50 overrun the reset mechanism and allow the rollers 93 to return to the bottom of the cam shoulder 96. This movement does not immediately affect the gripper devices 80 other than to cause them to be left in a readily triggerable disposition; as shown by FIG. 6.

When a work piece enters the receiving housing part 81 and engages the door part 86, the mechanism is triggered and the gripping jaw is moved into work holding position.

The control rod part 82 includes a control switch actuating member 105 at its upper end. The switch actuating member is guided within the confines of the sleeve like member 91 for vertical reciprocal movement with the control rod 82. Accordingly, when the gripper mechanism 80 is tripped, upon receipt of a work piece, the switch actuating member is moved downwardly and, as shown by FIGS. 3 and 9, contacts and actuates a control switch 106. The specific arrangement of control switches 106 and actuators 105, for the different carriers 50, is best shown by FIG. 9.

The control switches 106 are connected in the control circuit, as shown schematically by FIG. 16, which will be described in more detail hereinafter.

Figure 16:
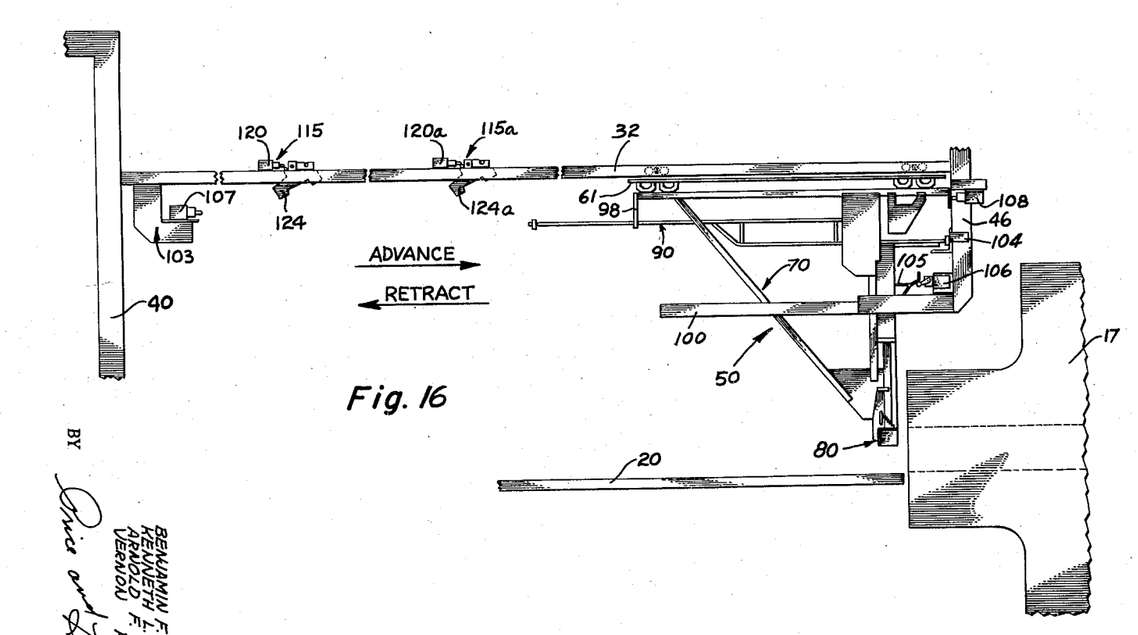
FIG. 16 is a schematic diagram showing the position of the control switches with relation to the puller and related apparatus.

FIG. 16 is a side elevational schematic view of the control switches for operating the motor 41. It should be understood that each extrusion puller has its own control switches which will be described hereinafter. However, in order to avoid unnecessary repetition, the control system for only one of the extrusion pullers will be described.

Referring to FIG. 16, the extrusion handling device or carrier 50 is shown supported on the overhead guide track 32. The extrusion handling device 50 is movable along the run-out table which extends from the press 10 to the tower 40. Supported on the lower end of the frame 70 of the extrusion handling device 50 is the work piece gripping mechanism 80. As previously described, the work piece gripping mechanism is aligned with the canister of the press 10 for receiving an extrusion strip as it emerges from the press.

Located at the press 10 is the limit switch 106 which is actuated by the switch actuator 105 of the reset mechanism. As previously described this switch actuator is moved downwardly when the gripper mechanism 80 is tripped. Thus, as the extruded strip passes into the gripper mechanism 80 the clamping mechanism is triggered into operation causing it to clamp or grip the extruded strip and during this clamping operation the limit switch 106 is actuated by the switch actuator 105 causing the motor 41 to pull the work handling device down the table in the retracted direction indicated by the "Retract" arrow. The work handling device 50 travels down the track to the limit switch assembly 115a located a short distance from the press. Limit switch assembly 115a, like assembly 115, is mounted on the track 32 for controlling the speed of the work handling device 50 as it approaches the press and also the end of the table. These two limit switches are very similar and will be described in more detail hereinafter. At the end of the table is the limit switch 107 which is actuated by the work handling device 50 for stopping the motor.

Now referring to the structure for actuating the various limit switches, FIGS. 9 and 10 show the structure and support means for the limit switches 106 and 108 and also the means for actuating the same. These figures show five of such switches and actuators utilized in a five puller arrangement. Each limit switch 106 is mounted on the frame 46 above the press by the brackets 145. Each switch includes a rotatable arm 146 which extends in a direction away from the press and in the path of the movement of the switch actuator 105. This switch actuator is secured to the rod 82 (FIGS. 5–8) so that as the clamping mechanism is triggered and the rod descends downwardly under the bias of the spring 84, the switch actuator 105 trips the switch 106 as shown by phantom line in FIG. 9. As will be described in more detail hereinafter, this starts the motor in a retracting direction.

The limit switch 108, also mounted on frame 46 above limit switch 106, has a plunger 147 which is actuated by the depending flange member 109 secured to frame member 71. The limit switch, as will be described hereinafter, stops the motor 41 when the work handling device 50 reaches the press and before the motor is set into operation by the limit switch 106.

Figure 11:
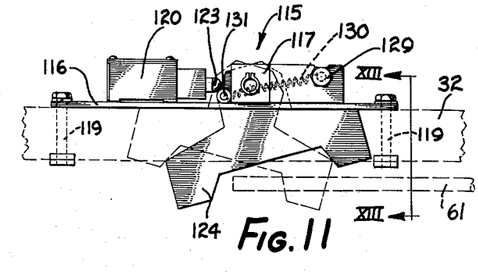
FIG. 11 is a side elevational view of one of the limit control switches mounted on the tracks of the apparatus.
Figure 12:
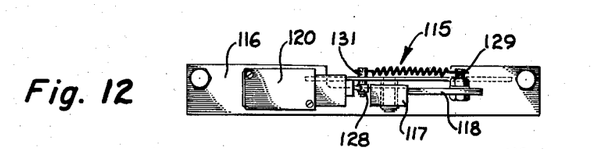
FIG. 12 is a plan top view of the limit control switch of FIG. 11.
Figure 13:
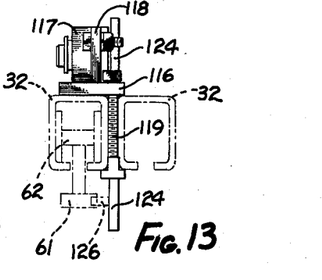
FIG. 13 is a cross-sectional view of the limit control switch taken along the section-line XIII—XIII of FIG. 11, showing in phantom the trolley part that actuates the switch.
Figure 17:
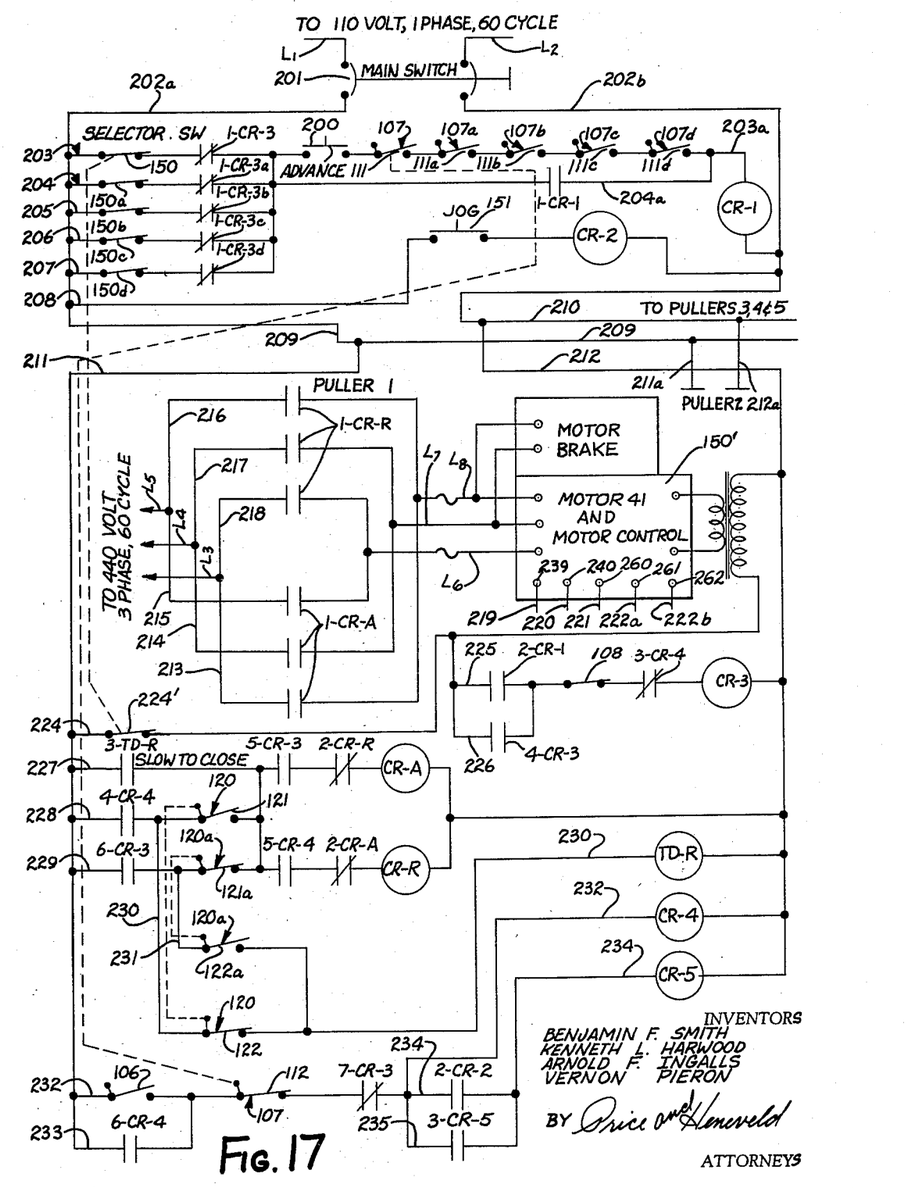
FIG. 17 is a schematic circuit diagram of the control circuit for the puller apparatus.

The two limit switch assemblies 115 and 115a are identical and therefore the structure of only one of these assemblies will be described. This structure is shown by FIGS. 11, 12 and 13. It includes a base plate 116 supporting a bearing block 117 and an upright or vertical spring support plate 118. The base plate 116 is mounted on the track 32 (shown in phantom) by the bolts 119. Pivotally mounted on the pivot block 117 is the switch actuator 124 extending downwardly between the tracks 32 (FIG. 13). This actuator is biased either to the right or to the left by spring 130 connected between the pin 129, mounted on the spring support plate 118, and pin 131 in an overcenter fashion the latter pin being on actuator 124. As a result, spring 130 holds switch actuator 124 in either of the positions shown by full line and phantom in FIG. 11. The plunger actuator 128 is mounted on pin 131 for engagement with plunger 123 of the limit switch 120 which is mounted on the support plate 116 adjacent actuator 124. This limit switch 120 has two sets of contacts 121 and 122 (FIG. 17). Contacts 122 are normally closed and contacts 121 are normally open in the normal position of the switch as shown in FIG. 11. In the position of the switch actuator shown by the phantom lines, the contacts 121 are closed and contacts 122 are open. For limit switch 120a, contacts 121a are normally closed and 122a normally open.

The switch assembly is actuated by the trolley 60 of the work handling device 50. This trolley as previously described includes the elongated bars 61 supported by the wheeled tracking means 62 (FIG. 13). Extending from one side of the elongated bar 61 is a striker pin 126 which extends to a position where it will strike and actuate the switch actuator 124.

By this structure, it should be readily evident that as the work handling device moves down the table in the retracted direction, the striker pin 126 engages or strikes the switch actuator 124 pivoting it to the position indicated in phantom. This causes the plunger actuator 128 to depress the plunger 123 and, in switch 120, to close switch contacts 121 and open switch contact 122 and, in switch 120a, to close contacts 122a and open contacts 121a. This controls the speed of the motor 41 as will be described hereinafter.

Figure 14:
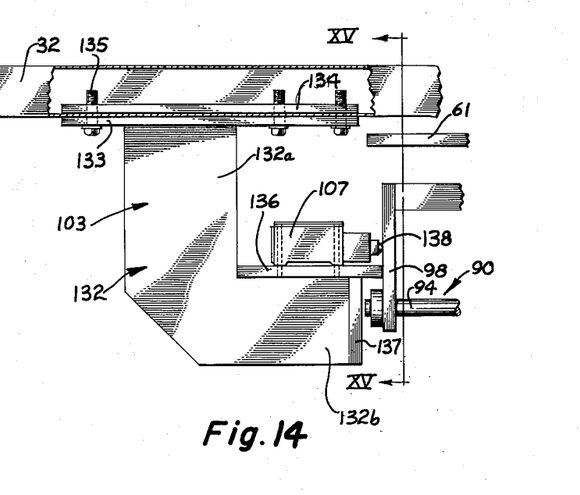
FIG. 14 is an enlarged side elevational view of the stop and control switch assembly mounted on the track and located at the end of the run-out table for resetting the gripper mechanism and controlling the motor.

FIG. 14 shows the stop 103 and limit switch 107 mounted at the end of the run-out table 20. The stop 103 includes the L-shaped member 132 secured to the track 32 and depending downwardly therefrom. This support member includes the vertical leg 132a and the horizontal leg 132b. The vertical leg 132a has attached to its top end the support flange 133 secured to the track by the hanger plate 134 having tapped openings receiving the bolts 135. The horizontal leg 132b supports a switch support plate 136 on which is supported the switch 107. At the very end of the horizontal leg 132b is attached a stop flange 137 provided for engagement by the end of rod 94 of the reset mechanism 90. The switch 107 has a plunger 138 adapted to be engaged by the depending flange 93. It should be readily evident from FIGS. 14 and 15 that as the carriers or work handling devices 50 reach the end of the run-out table, stop 103 is engaged by the reset mechanism 90 and the switch 107 is operated thus stopping the motor 41 and accordingly the movement of the carrier.

FIG. 17 shows the control circuit for the motor 41 which operates and drives the extrusion handling devices 50 along the guide track 32 and thus along the run-out table from the press to the end of the run-out table and return. This circuit diagram has a section designated by "Puller" for one puller and corresponding sections (not shown) for the other pullers. Therefore, it should be understood that separate circuit diagram sections are provided for each puller and as a result for a five puller apparatus five identical circuit diagram sections would be provided.

Figure 18:
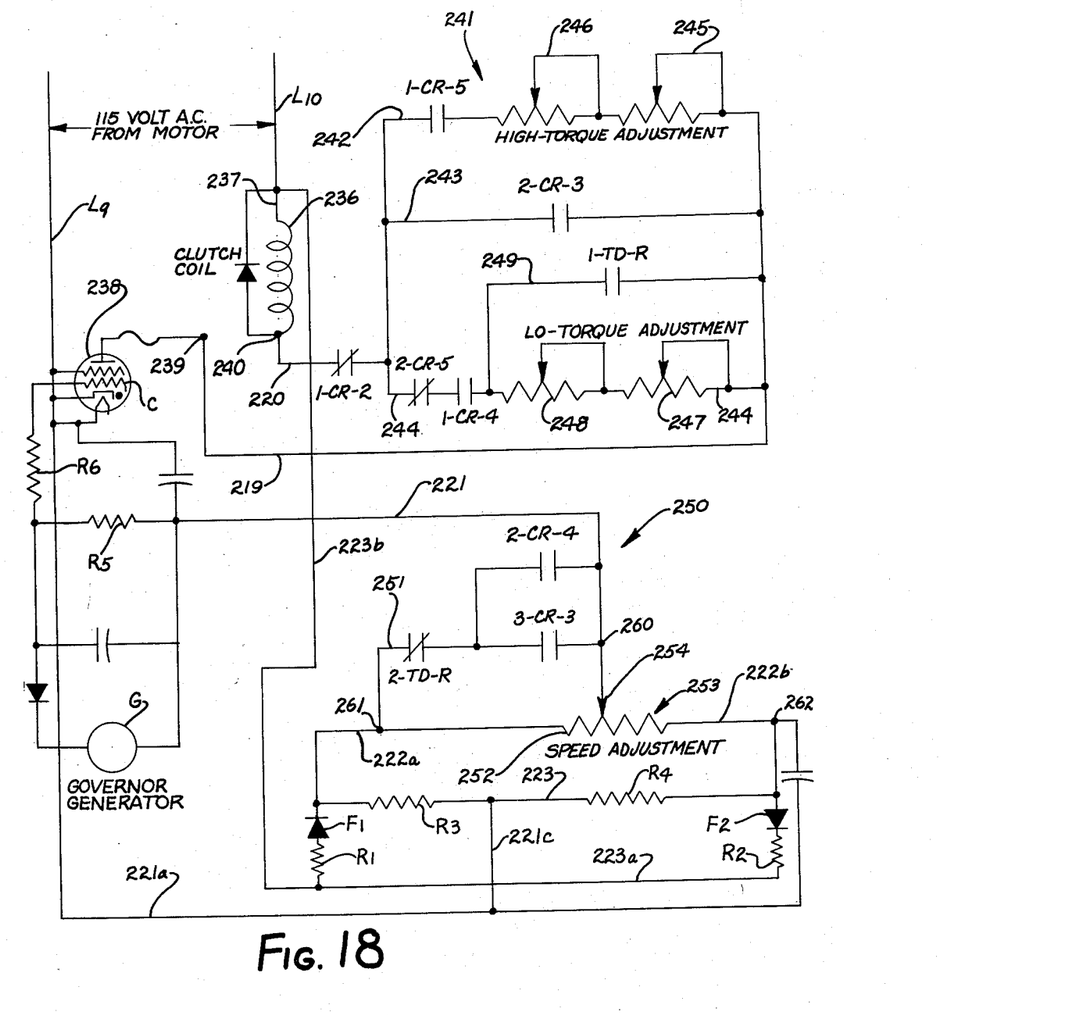
FIG. 18 is a schematic diagram of the speed and torque control circuit for the drive motor of the puller mechanism.

In describing the various components of the circuits of FIGS. 17 and 18, the identification symbols for the relay coils and relay contacts are related. For example, relay coil designated as CR–1 operates the relay contacts 1–CR–1 and 2–CR–1.

The entire circuit is connected to a 110-volt, 1 phase, 60-cycle source of power by the lines $L_1$ and $L_2$. Located in these lines is the main switch 201 for connecting and disconnecting the entire circuit from the power source. Leading from the main switch 201 are the two lines 202a and 202b across which the various branch lines, now to be described, are connected. Moving downwardly from the upper to the lower end of circuit of FIG. 17, the first branch line 203 has several electrical components connected therein including the selector switch 150, the normally closed relay contacts 1–CR–3, the advance button 200 and the contacts 111, 111a, 111b, 111c, and 111d of the limit switches 107, 107a, 107b, 107c and 107d, respectively. The selector switch 150, the advance button 200, and the contacts of the limit switch contacts 111, etc. are all connected in series with the coil relay CR–1. Branch line 204a, which by-passes all the switches and contacts of the portion 203a of line 203, is connected in series with the lines 204, 205, 206 and 207 which are connected in parallel with one another. Line 204 includes selector switch 150a and the normally closed relay contacts 1–CR–3a. Lines 205, 206 and 207 each include the selector switches 150b, 150c, and 150d, respectively, and the normally closed relay contacts 1–CR–3b, 1–CR–3c and 1–CR–3d, respectively. This arrangement permits each of the lines 204, 205, 206 and 207 to be connected in series with the coil CR–1 through either of the lines 203a or 204a. It will become obvious on describing the operation of this circuit, that this arrangement requires that all of the pullers be at the end of the table away from the press before any one of them is permitted to return to the press.

Line 208 has connected in series the "Jog" switch 151 and the relay coil CR–2. Downwardly of line 208, there is provided a separate circuit for each puller as previously referred to. This is illustrated in FIG. 17 by the common lines 209 and 210 to which the lines 211 and 212 of the circuit section identified as "Puller 1" is connected. Similarly, lines 211a and 212a, leading to the section "Puller 2," are connected to lines 209 and 210, respectively. This is repeated for as many pullers as are provided. As illustrated, this apparatus includes five pullers, therefore the circuits for five pullers will be connected to the lines 209 and 210 in the manner as illustrated by the section designated "Puller 1."

Each puller control circuit section includes a motor and motor control combination generally designated by the reference numeral 150'. Connected to the motor 41 of the motor and motor control combination 150' is a 440-volt, 3-phase, 60-cycle power source leading from the lines $L_3$, $L_4$, and $L_5$. These lines are connected to the lines 213, 214 and 215, respectively, and also the lines 216, 217 and 218, respectively. These lines are connected to the motor by the lines $L_6$, $L_7$ and $L_8$. Included in the lines 213, 214, and 215 are the relay contacts 1–CR–A, and included in the lines 216, 217, and 218 are the relay contacts 1–CR–R. The opening and the closing of these two sets of contacts determines the direction of the operation of motor 41.

Also connected to the motor and motor control arrangement 150' is the speed and torque control circuits for the drive motor. These circuits are shown in FIG. 18 and are connected to the motor and motor control combination 150' by the lines designated as 219, 220, 221, 222 and 223.

Below the motor and motor control is the line 224 which has connected in series the on-off switch 224'. This switch is mechanically connected to the selector switch 150 so that when the selector switch is closed the switch 224' is also closed. Connected in series with the switch 224' is a filament transformer for an electronic tube (not shown). Also connected in series with the switch 224' is the line 225 which includes the relay contacts 2–CR–1, the limit switch 108, the normally closed relay contacts 3–CR–4 and the coil relay CR–3. Line 226, shunting the relay contacts 2–CR–1, includes the relay contacts 4–CR–3 which holds the circuit closed after energization of coil CR–3 and when the contacts 2–CR–1 open.

The line 227 connects in series across the power source the relay contacts 3–TD–R, 5–CR–3, 2–CR–R and the advance relay coil CR–A which controls the operation of the relay contacts 1–CR–A previously described. Line 228 includes the relay contacts 4–CR–4 and the switch contacts 121 of the limit switch 120. Line 228 is connected in series with relay contacts 5–CR–3, 2–CR–R and the relay coil CR–A. It is also connected in series with the relay contacts 5–CR–4, 2–CR–A and the return relay coil CR–R of the line 229. Line 229 also includes the relay contact 6–CR–3 and the switch contacts 121a of the limit switch 120a. Line 230 is connected to line 228 between the relay contact 4–CR–4 and the switch contacts 121 thus connecting the relay contacts 4–CR–4 in series with the switch contacts 122, of the limit switch 120, and the time delay relay coil TD–R. Line 231 is connected between lines 229 and 230 thus connecting the switch contacts 122a of the limit switch 120a in series with the relay contacts 6–CR–3 and the time delay relay coil TD–R.

Line 232 connects in series the limit switch 106, the switch contacts 112 of limit switch 107, the normally closed relay contacts 7–CR–3 and the relay coil CR–4. Line 233, which includes the relay contact 6–CR–4, shunts the limit switch 106. Line 234 is connected to line 232 between the relay contact 7–CR–3 and the relay coil CR–4. This line 234 includes the relay contacts 2–CR–2 and the relay coil CR–5. Shunting the relay contacts 2–CR–2 is the line 235 which includes the relay contact 3–CR–5.

It should be evident from this circuit of FIG. 17 that the relay coil CR–1 controls the opening and closing of the relay contacts 1–CR–1 in line 204a and 2–CR–1 in line 225. Relay coil CR–2 controls the opening and closing of relay contact 2–CR–2 in line 234 and other such contacts located in the circuit of FIG. 18 which will subsequently be described. Relay coil CR–3 controls the opening and closing of the relay contacts 1–CR–3 in line 203, 4–CR–3 in line 226, 5–CR–3 in line 227, 7–CR–3 in line 232, and 6–CR–3 in line 229. Relay coil CR–3 also controls several relay contacts found in the circuit of FIG. 18.

The time delay relay TD–R controls the operation of the relay contacts 3–TD–R in line 227 and also several relay contacts found in FIG. 18. Relay coil CR–4 controls the operation of the relay contacts 3–CR–4 of line 225, 4–CR–4 of line 228, 5–CR–4 of line 229 and 6–CR–4 of line 233. It also controls relay contacts included in FIG. 18.

The relay coil CR–5 controls the opening and closing of the relay contacts 3–CR–5 of line 235 and also relay contacts found in FIG. 18.

FIG. 18 illustrates the speed and torque control circuit for the drive motor which includes the lines L9 and L10 connected to the alternating current from the motor 41. This motor control circuit includes a clutch coil 236 connected in line 237 between L10 and connection point 240 and thyratron 238 connected between line L9 and point 239. Connection points 239 and 240 are also shown in FIG. 17 on the motor and motor control combination 150'. Connected to these two points are lines 219 and 220, respectively, leading to the torque control circuit 241.

The torque control circuit 241 includes the lines 242, 243, and 244 connected in parallel with one another across the two lines 219 and 220. Line 242 includes rheostats 245 and 246 connected in series with each other and with relay contacts 1-CR-5 the closing of which is controlled by coil CR-5. The two rheostats 245 and 246 are adjustable for adjusting the hi-torque.

Line 243 includes the relay contacts 2-CR-3. When contacts 2-CR-3 are closed current is permitted to flow through line 243 by-passing the hi-torque line 242 and the lo-torque line 244 causing the motor to run at full torque.

Line 244 includes the rheostats 247 and 248 connected in series with each other and with the relay contacts 1-CR-4 and 2-CR-5. Relay contacts 2-CR-5 are normally closed and are operated by the coils CR-5 of FIG. 17 along with the relay contacts 1-CR-5. Thus when contacts 1-CR-5 are closed contacts 2-CR-5 are opened preventing the simultaneous flow of current through the two lines 242 and 244. The rheostats 247 and 248 are also adjustable for adjusting the lo-torque. By-passing or shunting the two lo-torque rheostats 247 and 248 is the line 249 having the relay contacts 1-TD-R. These contacts permit the lo-torque rheostats to be by-passed during a portion of the operation cycle of the apparatus as will be described in more detail hereinafter.

The relay contacts 1-CR-2 are located in the line 220 for completely disconnecting the torque control circuit 241 from the motor. When this occurs the clutch coil 236 is de-energized permitting the motor to run free. The "Jog" switch 151, which when closed energizes the relay coil CR-2, controls the opening and closing of relay contact 1-CR-2. Thus when the "Jog" switch is depressed, the clutch coil 236 is de-energized permitting the motor to run free. However, when the "Jog" switch 151 is released the clutch coil 236 is energized throwing in the clutch very quickly causing the motor to jerk the puller. This is provided, as will be explained hereinafter, for the purpose of jerking the extruded strip to break loose the strip from the die.

The torque control circuit 241 is controlled by the thyratron 238 which in turn is controlled by the governor generator G. The governor generator is connected across the filament and the control grid C of the thyratron. These two components of the thyratron 238 are in turn connected to a speed control circuit 250 provided for controlling the speed of the motor. The two limit switches 120 and 120a (FIG. 17) control the energization of the time delay relay TD-R which controls the speed control circuit 250 by opening the relay contacts 2-TD-R located in the line 251 of FIG. 18. These two relay contacts are connected in series with each of the relay contacts 2-CR-4 and 3-CR-3. These contacts control the speed of the motor by throwing in different values of resistors. The resistor in this example is designated as 252 and constitutes a part of the rheostat 253 which also includes the adjustable wiper or contact element 254.

The speed control circuit 250 also includes a full wave rectifier section which includes the rectifiers F1 and F2, one being arranged to conduct the negative portion of the alternating current and the other the positive portion of the current. These two rectifiers are each connected in series with the resistors R1 and R2, respectively and also in series with the speed adjustment resistor 252. Connected between the line 222a and rectifier F1 and line 222b and rectifier F2 is the line 223 having the resistors R3 and R4 connected in series. Line 223a is connected in parallel with line 223 on the opposite side of the resistors R1 and R2.

Speed control circuit 250 is connected to line $L_{10}$ by the line 223b which is connected to the line 223a. This permits the current to be fed back from the clutch coil 236 to the speed control circuit 250. The speed control circuit 250 is also connected to the thyratron by the lines 221 and 221a. Line 221 is connected to line 222b and to the filament and cathode of the thyratron; whereas line 221a is connected through the resistors R5 and R6 to the control grid of the thyratron. This arrangement supplies a rectified voltage to the thyratron.

The flow of current through the speed control 250 is through line 223b with the positive portion flowing through rectifier F1 and the negative portion flowing through rectifier F2. The half waves then flow through the resistors R3 and R4, respectively, and line 221C to the line 221a which is connected to the cathode and filament of the thyratron 238. The current also flows upwardly through line 222a and 222b either through the relay contacts or through the speed adjustment resistor 252 to the line 221a and then to the control grid of the thyratron. If either of the relay contacts 2-CR-4 or 3-CR-3 are closed and the relay contacts 2-TD-R are closed, the current flowing through line 222a bypasses or short circuits the rheostat 253 cutting out some of the resistance through which the current flows and thus increasing the speed of the motor. Whereas if any of the relay contacts are open the flow is through the resistor of the rheostat 253 which cuts down the speed of the motor. Wiper 254 is adjustable along the resistor 252 and thus the speed of the motor can be adjusted by adjusting the position of the wiper.

It should be noted that lines 219, 220, 221, 222a and 222b, all shown in FIG. 18, are also shown on FIG. 17 as connected to points 239, 240, 260, 261 and 262, to show the relationship between the control circuit of FIG. 18 with the circuit of FIG. 17.

*Operation*

The number of work handling devices 50 to be used for an extrusion operation is dependent upon the form of die 14 that is used. A separate work handling device is to be used for each opening in the die 14. The following operation describes the operation of a single work handling device. Each of the work handling devices 50 operate in substantially the same way.

The work handling device 50 is mounted on the guide track arrangement 30 in the manner described. The selected die 14 is mounted in the support 16. The proper canister, with the required passages for the selected die, is mounted in the platen 17 forwardly of the die. The press is thereafter prepared for operation by heating a billet and placing it in the platen or container 11 and preparing the press ram for action against the end of the billet.

Figure 19:
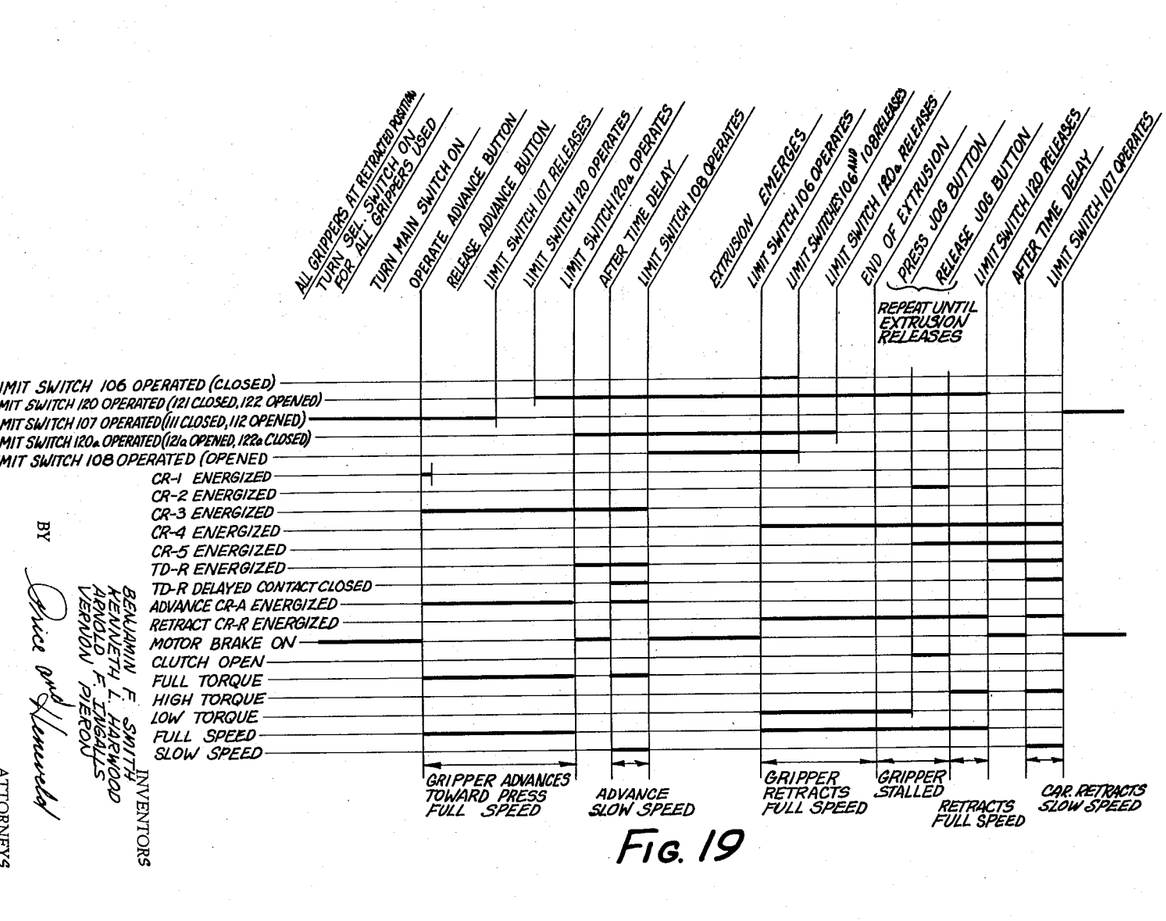
FIG. 19 is a chart showing the sequence of operations of the puller apparatus.

We will assume that at the start of the operation all the work handling devices are located near the end of the run-out table by the stop 103. This being the case, the operation can be followed by referring to the chart of FIG. 19 in conjunction with the apparatus and circuit diagrams illustrated with the other figures. First selected ones or one of the selector switches 150, 150a, 150b, 150c, or 150d are closed depending upon the puller to be used. If only Puller 1 is to be used, only selector switch 150 is closed. However, if Puller 2 is also to be used selector switch 150a is closed and correspondingly for Pullers 3, 4 and 5 switches 150b, 150c and 150d are closed. Assuming only Puller 1 is used, selector switch 150 is closed which also closes the on-off switch 224' located in the line 224. Since the work handling device or carrier 50 is located at the end of the pull out table, it is engaging the plunger 138 of the limit switch 107 mounted on the stop 103. As a result limit switch 107 is operated thereby closing contact 111 and opening contact 112. All of the limit switches 107a 107b, 107c and 107d are closed because the work handling devices 50 are all required to be located at the run-out table before any one of them is put into operation.

Then the advance button 200 is depressed closing a circuit through line 203 and 203a energizing the relay coil CR-1. This closes the contact 1-CR-1 in the line portion 204a of line 204. Coil CR-1 also closes the contacts 2-CR-1 in line 225 thus closing the circuit through lines 224 and 225 energizing the relay coil CR–3. Energization of relay coil CR–3 closes the relay contact 6–CR–3 in line 229 and 5–CR–3 in line 227. This energizes coil CR–A and thus closes the relay contacts 1–CR–A setting the motor 41 into operation.

The motor 41 through the cable 44 pulls in "Advance" direction the carrier or work handling device 50 at full speed determined by the closing of the relay contact 3–CR–3 in the line 251 of FIG. 18. This results from bypassing the voltage divider 253. The motor also pulls at full torque determined by the closing of the relay contact 2–CR–3 which by-passes both the hi-torque rheostat and lo-torque rheostat.

The energized relay coil CR–3 opens the normally closed relay contact 1–CR–3 thus opening the circuit to the relay coil CR–1 and de-energizing it. This opens 1–CR–1 in line 204a, and 2–CR–1 in line 225. However, the contacts 4–CR–3 closed by energization of the coil CR–3 maintains a closed circuit through the coil CR–3. Accordingly the motor continues to advance the carrier or work handling device 50 toward the press at full torque and full speed.

Figure 15:
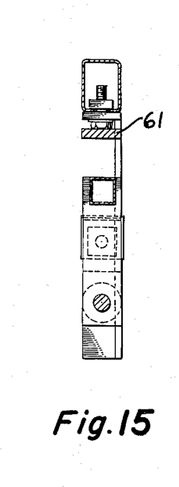
FIG. 15 is a cross-sectional view of the stop and control switch assembly taken along the section-line XV—XV of FIG. 14.

When the work handling devices or carrier 50 reaches limit switch assembly 115 the striking pin 126 mounted on the bar 61 of trolley 60 (FIG. 13) strikes the actuator 124 thereby pivoting it to the position as shown by full lines in FIGS. 11 and 15. In this position limit switch 120 is operated closing contacts 121 in line 228 and opening contacts 122 in line 230. This has no immediate effect on the energization of any of the relay coils.

A short time thereafter the work handling device or carrier 50 actuates the switch assembly 115a by pivoting the switch actuator 124 to the position shown in full lines by FIGS. 11 and 15. This operates the limit switch 120a opening the contacts 121a and closing the contacts 122a. This immediately opens the circuit through the relay coil CR–A and as a result open the contacts 1–CR–A stopping the motor 41. However, closing of contacts 122a of line 231 closes the circuit through lines 229, 231 and 230 the latter connected to the time delay relay TD–R. After a short time delay the relay contacts 3–TD–R in line 227 close. As a result the circuit through coil CR–A closes energizing it and closing the relay contacts 1–CR–A setting the motor 41 into operation for advancing the work handling device or carrier 50. However, the coil TD–R also opens the normally closed contacts 2–TD–R in line 251 of FIG. 18, which opens the lines by-passing the voltage divider 252. As a result the current is required to flow through a part of a resistor 252 which causes the motor to operate at slow speed. Thus a work handling device or carrier 50 is slowly brought into extrusion receiving position at the press.

When several work handling devices are utilized, they are brought together to proper position by an alignment means more specifically set forth in the copending application Serial No. 841,720, entitled Extrusion Puller Equipment, filed September 23, 1959 previously referred to.

When the work handling device or carrier 50 reaches the press limit switch 108 is actuated or operated. This limit switch located in the line 225 of FIG. 17 de-energizes the relay coil CR–3 and as a result opens the relay contacts 2–CR–3, 3–CR–3, 4–CR–3, 5–CR–3, and 6–CR–3. The opening of the contacts 5–CR–3 and 6–CR–3 prevents the closing of the circuit through the relay coil CR–A, as a result de-energizing it and opening the contacts 1–CR–A thus stopping the motor 41. Immediately the motor brake is applied as well known in the art. Simultaneously, the normally closed contacts 1–CR–3 in line 203 and 7–CR–3 in line 232 are closed by the de-energization of the relay coil CR–3.

With the work handling device or carrier 50 in position for the gripper 80 to receive the extrusions, the press is placed into operation causing the press ram 13 (FIG. 1) to force the material of the billet through the die 14. Therefore the extruded work pieces or extrusions are received through the canister 18, and are directed toward the run-out table 20. The work pieces pass into funnel member 88 (FIG. 3) which are a part of the work receiving houses 81. This arrangement is also best disclosed in copending application Serial No. 841,720 entitled Extrusion Puller Equipment, filed September 23, 1959.

As the extruded piece passes through the funnel members 88, the piece or extrusion engages the door or gate 86 triggering the clamping mechanism into operation. As the clamping rod 82 drops, under pressure of spring 84, and clamps onto the extruded piece, the switch actuator 105 actuates switch 106 which in FIG. 17 is located in line 232.

Closing of the switch 106 closes the circuit to line 232 and energizes the relay coil CR–4 which closes the contacts 1–CR–4 and 2–CR–4 of FIG. 18, and 4–CR–4, in line 228, 5–CR–4 in line 229, and 6–CR–4 in line 233 of FIG. 17. It opens contacts 3–CR–4 in line 225 preventing the energization of the coil CR–3. The closed contacts 4–CR–4, 121 of limit switch 120, 5–CR–4 and 2–CR–A closes the circuit through the relay coil CR–R thus energizing it which closes the contacts 1–CR–R causing the motor 41 to be operated in the retract direction. Motor 41 then pulls the work handling device or carrier 50 in the "Retract" direction (FIG. 16). During this pulling operation the relay contacts 2–CR–4 (FIG. 18) cause the speed adjustment voltage divider 253 to be by-passed and as a result the motor pulls at its full speed. However, the handling devices 50 in reality travel at a moderate rate dictated by the flow of metal through the extrusion die 14. Lo-torque is applied as a result of the closing of relay contact 1–CR–4 (FIG. 18) of the torque control circuit 241. The closing of the contacts 1–CR–4 and the opening of contacts 2–CR–3 causes the current to flow through the two rheostats 247 and 248 thus accounting for the lo-torque. This condition exists until the entire billet 12 is expended and the end of the extrusion is reached, at which time the work handling device or carrier 50 stops due to its inability to free the extrusion from the die. In some instances, particularly with thin extruded sections the work handling device or carrier 50 will pull the extrusion from the die but this is unusual and therefore it will be assumed for purposes of illustration and description that the carrier stops at the completion of the extrusion.

When the carrier or work handling device 50 stops due to its inability to break the extrusion loose from the die, the "Jog" button 151 located in line 208 is depressed. This energizes the relay coil CR–2 which opens the contacts 1–CR–2 in line 220 of FIG. 18. This completely de-energizes the clutch coil 236 and permits the motor to run free at full speed. Release of the "Jog" switch 151 closes the contacts 1–CR–2 throwing in the clutch which creates a jerking effect on the carrier 50. This is repeated until the extrusion is released from the die.

Energization of coil CR–2 also closes the contact 2–CR–2 in line 234 energizing the relay coil CR–5 which closes the contacts 3–CR–5 so that when the contacts 2–CR–2 are opened the contact 3–CR–5 holds the coil CR–5 energized.

The energization of coil CR–5 closes the contacts 1–CR–5 located in the line 242 of FIG. 18 and opens the contacts 2–CR–5 located in the line leading to the lo-torque rheostats 247 and 248. This causes a hi-torque to be exerted on the motor as the clutch is opened and closed. Thus a hi-torque jerk is exerted by the motor on the work handling devices 50 which jerk is transmitted to the extrusions.

After the extrusions are broken loose from the die the work handling device or carrier 50 pulls the entire extruded strip along with it on the table until it reaches the limit switch assembly 115 at which time the trolley pivots the switch actuator 124 in a clockwise direction represented by the phantom lines in FIG. 11. This makes the limit switch 120 inoperative thereby opening the contacts 121 and closing the contacts 122 as shown by FIG. 17. Since the relay contacts 4-CR-4 are closed by the energization of the coil CR-4 the circuit is closed through lines 228 and 230 through the time delay relay coil TD-R. After a time delay the relay contacts 3-TD-R close thus completing the circuit through the lines 227 and 229 energizing the coil CR-R and thus closing the contacts 1-CR-R for effecting the movement of the work handling device in the "Retract" direction. This movement is slow because of the opening of the contacts 2-TD-R in line 251 of FIG. 18 which requires the current to flow through the voltage divider 253. Finally the work handling device or carrier 50 reaches the end of the table at the stop 103. At the end of the table at stop 103, the reset mechanism 90 strikes the stop flange 137 (FIG. 14). The interconnected rods 94 and 95 (FIG. 3) are moved relatively within the support frame 70 and the gripper devices 80 are released from engagement with the work and reset for subsequent operation. Continued travel of the work handling device 50 causes the hanging support bracket 98 of the frame 70, at the forward end thereof, to engage the plunger 138 of limit switch 107. This immediately opens the contacts 112 and closes the contacts 111 thus de-energizing the two coils CR-4 and CR-5 which opens the contacts 5-CR-4 and 4-CR-4 de-energizing the relay coil CR-R. The entire circuit is then in the same condition as it was originally with all the grippers at the end of the run-out table.

After the extruded work pieces are removed from the work receiving members 81, the work handling device 50 is ready to be returned to the press 10, and the entire operation is repeated.

Having described this invention it should become obvious that although one preferred form is illustrated, alterations and modifications thereof are possible within the broadest aspect and spirit of this invention. Accordingly, this invention should be limited only as set forth by the express language of the appended claims.

We claim:

1. Extrusion handling apparatus, comprising an elongated horizontal run-out table for receiving extrusions from the die of an extrusion press; a carrier means supported for travel along said run-out table from a first position at said press to an end position substantially at the end of said run-out table; a clamping means supported by said carrier means and in said first position located in the path of an extrusion emerging from the die for receiving the extrusion and gripping the same; said clamping means having a clamping member movable from a retracted position to a gripping position; a motive power means for moving said carrier means and clamping means along said table; electrical control means for initially controlling the operation of said motive power means in a direction moving said clamping means away from said press; an electrical switch forming a part of said electrical control means and having a tripping element for operating the same; a switch actuator operatively secured to and movable with said clamping element from a retracted position to an actuating position corresponding respectively with said retracted and gripping positions of said clamping element; said tripping element being located in the path of the movement of said switch actuator at a position for actuation by said actuator at its actuating position whereby actuation of said tripping element and operation of said control means and motive power means occurs only after gripping of said extrusion by said clamping means.

2. Extrusion handling apparatus, comprising an elongated horizontal run-out table for receiving extrusions from the die of an extrusion press; a carrier means supported for travel along said run-out table from a first position at said press to an end position substantially at the end of said run-out table; a clamping means supported by said carrier means and in said first position located in the path of an extrusion emerging from the die for receiving the extrusion and gripping the same; said clamping means having a clamping member movable from a retracted position to a gripping position; a motive power means for moving said carrier means and clamping means along said table, said motive power means having at least fast and slow speeds; electrical control means for initially controlling the operation of said motive power means in a direction moving said clamping means away from said press at said fast speed; an electrical switch forming a part of said electrical control means and having a tripping element for operating the same; a switch actuator operatively secured to and movable with said clamping element from a retracted position to an actuating position corresponding respectively with said retracted and gripping positions of said clamping element; said tripping element being located in the path of the movement of said switch actuator at a position for actuation by said actuator at its actuating position whereby actuation of said tripping element and operation of said control means and motive power means occurs only after gripping of said extrusion by said clamping means; retarder control means including a first electrical limit switch at a slow-down position near the end of said run-out table but spaced a short distance therefrom in a direction toward said press; said retarder control means being connected to said motive power means to effect a reduction in speed thereof for operating said motive power means at said slow speed; a terminal electrical control means including a second electrical limit switch located in a terminal position substantially at the end of said run-out table for terminating the operation of said motive power means in a direction moving said clamping means away from said press; and striker means operatively connected to said carrier means for actuating said first and second limit switches when said carrier means reaches said slow-down and terminal positions, respectively.

3. Extrusion handling apparatus, comprising an elongated horizontal run-out table for receiving extrusions from the die of an extrusion press; a carrier means supported for travel along said run-out table from a first position at said press to an end position substantially at the end of said run-out table; a clamping means supported by said carrier means and in said first position located in the path of an extrusion emerging from the die for receiving the extrusion and gripping the same; said clamping means having a clamping member movable from a retracted position to a gripping position; a motive power means for moving said carrier means and clamping means along said table, said motive power means having at least fast and slow speeds; electrical control means for initially controlling the operation of said motive power means in a direction moving said clamping means away from said press at said fast speed; an electrical switch forming a part of said electrical control means and having a tripping element for operating the same; a switch actuator operatively secured to and movable with said clamping element from a retracted position to an actuating position corresponding respectively with said retracted and gripping positions of said clamping element; said tripping element being located in the path of the movement of said switch actuator at a position for actuation by said actuator at its actuating position whereby actuation of said tripping element and operation of said control means and motive power means occurs only after gripping of said extrusion by said clamping means; retarder control means including a first electrical limit switch at a slow-down position near the end of said run-out table but spaced a short distance therefrom in a direction toward said press; said retarder control means being connected to said motive power means to effect a reduction in speed thereof for operating said motive power means at said slow speed; a terminal electrical control means including a second electrical limit switch located in a terminal position substantially at the end of said run-out table for terminating the operation of said motive power means in a direction moving said clamping means away from said press; and means operatively connected to said carrier means for actuating said first and second limit switches when said carrier means reaches said slowdown and terminal positions; means for effecting the reversal of said motive power means to return the carrier and clamping means to said press; a second retarder control means including a third electrical limit switch located near said press but spaced a short distance therefrom in a direction toward the end of said run-out table; and a second terminal control means including a fourth limit switch located at said press; said second retarder control means and second terminal control means being connected to said motive power means and said third and fourth limit switches being actuated by said carrier for sequentially slowing down and then stopping said carrier at said press with said clamping means in extrusion receiving position.

4. Extrusion handling apparatus, comprising an elongated horizontal run-out table for receiving extrusions from the die of an extrusion press; a carrier means supported for travel along said run-out table from a first position at said press to an end position substantially at the end of said run-out table; a clamping means supported by said carrier means and in said first position located in the path of an extrusion emerging from the die for receiving the extrusion and gripping the same; said clamping means having a clamping member movable from a retracted position to a gripping position; a motive power means for moving said carrier means and clamping means along said table, said motive power means having at least fast and slow speeds; electrical control means for initially controlling the operation of said motive power means in a direction moving said clamping means away from said press at said fast speed; an electrical switch forming a part of said electrical control means and having a tripping element for operating the same; a switch actuator operatively secured to and movable with said clamping element from a retracted position to an actuating position corresponding respectively with said retracted and gripping positions of said clamping element; said tripping element being located in the path of the movement of said switch actuator at a position for actuation by said actuator at its actuating position whereby actuation of said tripping element and operation of said control means and motive power means occurs only after gripping of said extrusion by said clamping means; means for causing said motive power means to move said carrier means and clamping means to said end position and return to said press; and retarder control means connected to said motive power means for causing it to operate at said slow speed including a limit switch spaced from said press a short distance down the run-out table, and striker means on said carrier for actuating said limit switch only on the return of said carrier to said press for slowing down the motor previous to its reaching the press.

References Cited in the file of this patent
UNITED STATES PATENTS

| | | |
|---|---|---|
| 504,591 | Kees | Sept. 5, 1893 |
| 551,306 | Converse et al. | Dec. 10, 1895 |
| 898,262 | Renken | Sept. 8, 1908 |
| 956,157 | Parmley | Apr. 26, 1910 |
| 1,768,866 | Summey | July 1, 1930 |
| 1,849,044 | Summey | Mar. 8, 1932 |
| 1,911,549 | Catterall | May 30, 1933 |
| 2,367,793 | McIlvried et al. | Jan. 23, 1945 |
| 2,387,532 | Schenk | Oct. 23, 1945 |
| 2,446,438 | Strock | Aug. 3, 1948 |
| 2,485,523 | Ashbaugh | Oct. 18, 1949 |
| 2,575,792 | Bullard et al. | Nov. 20, 1951 |
| 2,720,310 | Yack et al. | Oct. 11, 1955 |
| 2,753,588 | Grosh | July 10, 1956 |
| 2,767,269 | Kerr | Oct. 16, 1956 |
| 2,850,998 | Williams | Sept. 9, 1958 |
| 2,893,552 | Davies | July 7, 1959 |
| 2,914,170 | Kent | Nov. 24, 1959 |
| 2,998,124 | Bardes et al. | Aug. 29, 1961 |

FOREIGN PATENTS

| | | |
|---|---|---|
| 284,085 | Great Britain | Jan. 26, 1928 |
| 878,626 | Germany | June 5, 1953 |